(12) United States Patent
Baba et al.

(10) Patent No.: US 8,724,277 B2
(45) Date of Patent: May 13, 2014

(54) COMMUNICATION DEVICE, POWER SUPPLYING METHOD THEREFOR, AND POWER SUPPLY SYSTEM

(75) Inventors: Masanori Baba, Fukuoka (JP); Tsuyoshi Yamaguchi, Fukuoka (JP); Yoshimi Tokunaga, Kumamoto (JP); Mutsuhiko Ooishi, Fukuoka (JP)

(73) Assignee: Panasonic Corporation, Osaka (JP)

( * ) Notice: Subject to any disclaimer, the term of this patent is extended or adjusted under 35 U.S.C. 154(b) by 289 days.

(21) Appl. No.: 13/161,363

(22) Filed: Jun. 15, 2011

(65) Prior Publication Data

US 2011/0310519 A1 Dec. 22, 2011

(30) Foreign Application Priority Data

Jun. 17, 2010 (JP) ................. P2010-137963

(51) Int. Cl.
*G06F 1/32* (2006.01)

(52) U.S. Cl.
USPC .......... 361/91.1; 307/126; 455/127.1

(58) Field of Classification Search
CPC ............ G06F 1/263; G06F 1/266; G06F 1/32
USPC ............... 361/91.1; 307/653, 126; 455/127.1
See application file for complete search history.

(56) References Cited

U.S. PATENT DOCUMENTS

| 5,727,049 | A | * | 3/1998 | Sato ............................ 379/93.17 |
| 5,978,192 | A | * | 11/1999 | Young et al. ..................... 361/56 |
| 6,151,652 | A | * | 11/2000 | Kondo et al. .................. 713/300 |
| 6,438,639 | B1 | * | 8/2002 | Bakke et al. ................... 710/302 |
| 6,483,204 | B2 | * | 11/2002 | Hanaki ........................... 307/23 |
| 6,704,827 | B1 | | 3/2004 | Smith |
| 6,972,542 | B2 | * | 12/2005 | Patino et al. ................... 320/106 |
| 7,821,753 | B2 | * | 10/2010 | Evans et al. ..................... 361/90 |
| 8,447,995 | B2 | * | 5/2013 | Biederman et al. ........... 713/300 |
| 2005/0197094 | A1 | * | 9/2005 | Darshan et al. ............... 455/402 |
| 2007/0230225 | A1 | | 10/2007 | Tsukamoto |

FOREIGN PATENT DOCUMENTS

| EP | 2 172 831 | 4/2010 |
| JP | 2009-273219 | 11/2009 |
| JP | 2010-117789 A | 5/2010 |
| WO | 2009/137061 | 11/2009 |

OTHER PUBLICATIONS

International Search Report dated May 10, 2012.
Written Opinion of the International Searching Authority dated May 10, 2012.

* cited by examiner

*Primary Examiner* — Stephen W Jackson
*Assistant Examiner* — Zeev V Kitov
(74) *Attorney, Agent, or Firm* — Seed IP Law Group PLLC

(57) ABSTRACT

A communication device that establishes a communication with another communication device and supplies electric power to the other communication device by way of a transmission channel, the device comprises a supply voltage generation section that generates a supply voltage, a first detection section that detects a connection of an electric device other than the other communication device to the transmission channel, and an output control section that controls a supply of electric power to the other communication device, wherein the output control section supplies no power to the other communication device when the first detection section detects the connection of the electric device.

14 Claims, 9 Drawing Sheets

COMMUNICATION DEVICE, POWER SUPPLYING METHOD THEREFOR, AND POWER SUPPLY SYSTEM

BACKGROUND

1. Field of the Invention

The present invention relates to a communication device that supplies electric power to another communication equipment by use of a transmission channel, a power supplying method therefor, and a power supply system.

2. Description of the Related Art

Importance has recently been imposed on battery safety, and safety measures have been sought. For instance, battery information, including information about whether or not a battery is a genuine battery and information about whether or not charging operation can be performed under ambient environment conditions, is first exchanged between a battery and a device before commencement of charging operation. Charging operation is commenced only when consensual validation is acquired.

As described in connection with; for instance, a Patent Document (JP-A-2009-273219), a method for controlling supplying power to a rechargeable battery connected to a charging circuit has already been proposed, and the method is now described by use of FIG. 12. Under the method, an internal power circuit (built in the charging circuit) that authenticates whether or not a connected rechargeable battery is rechargeable is instantaneously supplied with operable power. In contrast, the rechargeable battery is supplied with electric power whose current value is lower than that of electric power fed during boost charge; hence, the rechargeable battery is charged more slowly during normal charging operation than during boost charging operation. Therefore, even if a state of charge (SOC) of the rechargeable battery is empty, the battery can be safely charged.

Subsequently, when the rechargeable battery is charged up to a voltage that the battery becomes able to perform authentication through pre-charge operation (by means of a comparatively low current value), the rechargeable battery transmits rechargeable battery information to an internal circuit of the device by way of a charge authentication terminal (not shown). The internal circuit of the device acquired the information about the rechargeable battery performs processing for authenticating the rechargeable battery. When the internal circuit of the device determines that the rechargeable battery is rechargeable, an electric current of electric power fed to the rechargeable battery is made greater than that of electric power fed during the preliminary charge. Thereby, the rechargeable battery can be charged rapidly (see; for instance, Patent Document 1).

However, the technique described in connection with Patent Document 1 is limited to a relationship between the charging circuit and the rechargeable battery (i.e., a one-to-one relationship). Provided that a plurality of communication devices and electric devices are connected a supply line, a voltage applied to the supply line is shared among the plurality of electric devices. Therefore, the technique described in connection with Patent Document 1 cannot address the situation.

SUMMARY

Accordingly, embodiments of the present invention to be described below are intended for providing a communication device, a power supplying method therefor, and a power supply system that enable safe supplying of electric power even when there is used a supply line which may be connected to a plurality of communication devices and electric devices.

A communication device of an embodiment to be described later is directed toward a communication device that establishes a communication with another communication device and supplies electric power to the other communication device by way of a transmission channel, the device comprising: a supply voltage generation section that generates a supply voltage; a first detection section that detects a connection of an electric device other than the other communication device to the transmission channel; and an output control section that controls a supply of electric power to the other communication device, wherein the output control section supplies no power to the other communication device into a state of no power supplying when the first detection section detects the connection of the electric device.

A power supplying method of an embodiment to be described below is directed toward a power supplying method for use with a communication device that establishes a communication with another communication device and supplies electric power to the other communication device by way of a transmission channel, the method comprising: detecting a connection of an electric device other than the other communication device to the transmission channel; and stopping a power supply to the other communication device when there is a connection of the other communication device to the transmission channel.

A power supply system of an embodiment to be described later is directed toward a power supply system comprising: a first communication device capable of establishing a communication with a first electric device; and a second communication device capable of establishing a communication with a second electric device by way of a first transmission channel, the first communication device establishing a communication with the second communication device and supplying electric power to the second communication device by way of a second transmission channel, wherein the first communication device stops the power supply to the second communication device when the first communication device detects an electric device other than the second communication device in the second transmission channel.

According to the communication device, the power supplying method, and the power supply system, a check is made, before commencement of power supplying, as to whether or not another electric device is connected to a transmission channel that supplies electric power to another communication device, whereby power can be safely fed to the electric device.

DETAILED DESCRIPTION

A communication device, a power supplying method therefor, and a power supply system of an embodiment are hereunder described by reference to the drawings.

Figure 1:
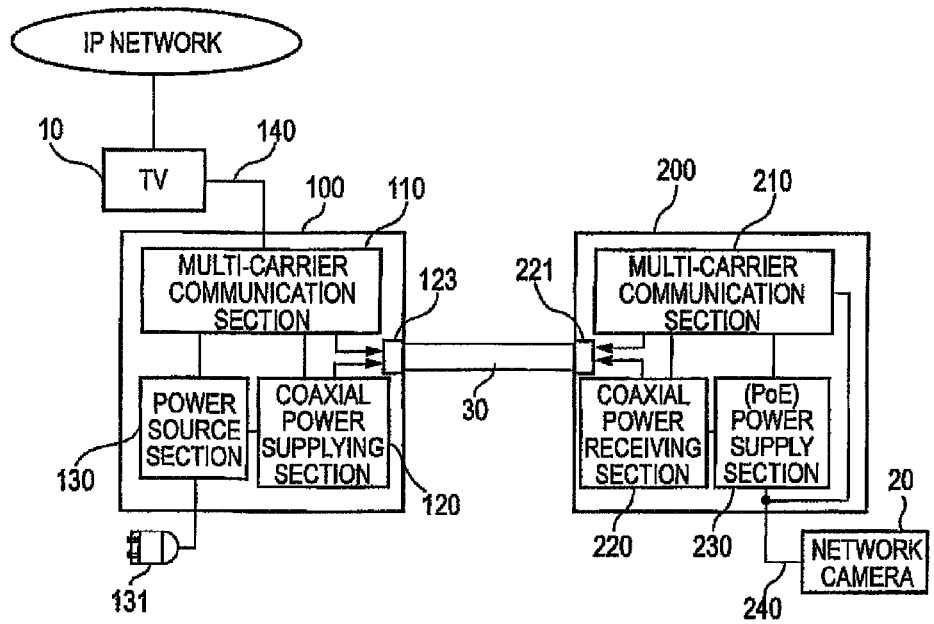
FIG. 1 is an illustration showing an overview of a power supply adaptor and a power receiving adaptor of an embodiment.

Referring to FIG. 1, explanations are first given to an overview of supplying electric power to a network camera 20 by utilization of a power supply adaptor 100 and a power receiving adaptor 200 as well as to an overview of communication between a television set 10 and the network camera 20. FIG. 1 is an illustration showing an overview of the power supply adaptor 100 and the power receiving adaptor 200 of the embodiment of the present invention.

The power supply adaptor 100 is communication equipment and serves as a master-unit-side adaptor for supplying electric power to the power receiving adaptor 200. The power supply adaptor 100 is connected to a first electric device by means of an Ethernet (Registered Trademark) cable 140 to thereby be able to communicate with the first electric device. In the present embodiment, explanations are provided by means of taking the television (TV) set 10 as an example first electric device. The power receiving adaptor 200 is communication equipment and serves as a slave-unit-side adaptor that receives electric power from the power supply adaptor 100. The power receiving adaptor 200 is connected to a second electric device by means of an Ethernet (Registered Trademark) cable 240 to thereby be able to communicate with the second electric device. In the present embodiment, explanations are given by means of taking the network camera 20 as an example second electric device. The television set 10 is able to output a video, as well as being connected to an IP network. The network camera 20 distributes videos and sounds recorded by way of the Ethernet (Registered Trademark) cable 240. Communication between the power supply adaptor 100 and the first electric device can also be implemented in the form of a wireless communication rather than a wired communication.

A conceivable supply line and a conceivable communication channel between the power supply adaptor 100 and the power receiving adaptor 200 include a telephone line, an Ethernet (Registered Trademark) cable, a coaxial cable, and others. In the present embodiment, explanations are provided by use of a coaxial cable 30. The coaxial cable 30 is connected to a coaxial connector 123 provided in the power supply adaptor 100 and a coaxial connector 221 provided in the power receiving adaptor 200, thereby establishing an electrical connection between the power supply adaptor 100 and the power receiving adaptor 200 and also a transmission channel between the power supply adaptor 100 and the power receiving adaptor 200. Specifically, the power supply adaptor 100 establishes communication with the power receiving adaptor 200 by way of the coaxial cable 30. Consequently, the television set 10 and the network camera 20 are communicable by way of the power supply adaptor 100, the coaxial cable 30, and the power receiving adaptor cable 200. The videos and sounds distributed by the network camera 20 can thereby be output to the television set 10. As mentioned above, the television set 10 is connected to an IP network. For this reason, the videos and sounds distributed by the network camera 20 can be browsed in real time at a remote location by use of communication equipment capable of being connected to an IP network; for instance, a PC (Personal Computer), a portable phone, and the like.

The coaxial cable 30 is also a supply line between the power supply adaptor 100 and the power receiving adaptor 200. When supplied with electric power from a receptacle (not shown) by way of a power plug 131, the power supply adaptor 100 supplies electric power to the power receiving adaptor 200 by way of the coaxial cable 30. The power receiving adaptor 200 thereby becomes operable and supplies PoE [Power over Ethernet (Registered Trademark)] electric power to the network camera 20 by way of the Ethernet (Registered Trademark) cable 240. When the network camera 20 and the power receiving adaptor 200 receive electric power from the power supply adaptor 100, the television set 10 and the network camera 20 can perform communication. As mentioned above, the power receiving adaptor 200 and the network camera 20 are supplied with electric power from the power supply adaptor 100, and hence the power receiving adaptor 200 and the network camera 20 can operate and communicate without involvement of insertion of their power plugs, or the like, into the receptacles.

The network camera 20 is frequently installed at a location remote from the master unit. At this time, the transmission channel between the power supply adaptor 100 and the power receiving adaptor 200 is implemented as the coaxial cable 30 in the present embodiment. When compared with a wireless LAN (Local Area Network), the coaxial cable 30 is less prone to influence of shields, like buildings, and radio noise from surroundings, and others. For this reason, stable, long-distance, high-speed transmission can be implemented.

A general configuration of the power supply adaptor 100 is now described.

The power supply adaptor 100 includes a multi-carrier communication section 110, a coaxial power supplying section 120, and a power source section 130. The coaxial cable 30 is electrically connected to the multi-carrier communication section 110 and the coaxial power supplying section 120 by way of the coaxial connector 123.

The multi-carrier communication section 110 is connected to the television set 10 by way of the Ethernet (Registered Trademark) cable 140 and converts IP data transmitted from the television set 10 into a multi-carrier signal. A coupler transformer to be described later superimposes the multi-carrier signal on a voltage in the coaxial cable 30. The power supply adaptor 100 thereby becomes able to transmit the multi-carrier signal to the power receiving adaptor 200 by way of the coaxial cable 30. The multi-carrier communication section 110 also converts the multi-carrier signal transmitted from the power receiving adaptor 200 into IP data and transmits the IP data to the television set 10 by way of the Ethernet (Registered Trademark) cable 140. Further, the multi-carrier communication section 110 is electrically connected to the coaxial supplying section 120 and the power source section 130 and includes a CPU (Central Processing Unit that is hereinafter described as "CPU 1") (not shown) that serves as a control section. The CPU 1 controls the power supply adaptor 100.

The coaxial power supplying section 120 supplies electric power to the power receiving adaptor 200 by way of the coaxial cable 30. The coaxial supplying section 120 finds various problems in the coaxial cable 30 or the power supply adaptor 100 (which will be described later). The CPU 1 included in the multi-carrier communication section 110 can thereby control power supplying.

The power source section 130 converts commercial power (an AC voltage) received from the power plug 131 into a DC voltage that is fed to the power receiving adaptor 200, as well as converting the commercial power into a DC voltage consumed by the power supply adaptor 100. Specifically, the power source section 130 supplies DC voltages required respectively for the multi-carrier communication section 110 and the coaxial supplying section 120. Moreover, it is preferable that the power source section 130 should have the capability of protecting the power supply adaptor 100 from an over-current or over-voltage and absorbing noise stemming during conversion of an AC voltage into a DC voltage.

A general configuration of the power receiving adaptor 200 is now described.

The power receiving adaptor 200 has a multi-carrier communication section 210, a coaxial power receiving section 220, and a (PoE) power supply section 230. The power receiving adaptor 200 operates upon receipt of electric power from the power supply adaptor 100 by way of the coaxial cable 30. The coaxial cable 30 is electrically connected to the multi-carrier communication section 210 and the coaxial power receiving section 220 by way of the coaxial connector 221.

The multi-carrier communication section 210 converts into IP data the multi-carrier signal transmitted from the power supply adaptor 100 by way of the coaxial cable 30. The multi-carrier communication section 210 thereby becomes able to transmit the IP data to the network camera 20 by way of the Ethernet (Registered Trademark) cable 240. The multi-carrier communication section 210 also converts the IP data, which are transmitted from the network camera 20 by way of the Ethernet (Registered Trademark) cable 240, into the multi-carrier signal. The coupler transformer to be described later superimposes the multi-carrier signal on the coaxial cable 30. The multi-carrier communication section 210 thereby becomes able to transmit the multi-carrier signal to the power supply adaptor 100 by way of the coaxial cable 30. Further, the multi-carrier communication section 210 is electrically connected to the coaxial power receiving section 220 and the (PoE) power supply section 230 and includes a CPU (hereinafter described as a "CPU 2") that serves as a control section. The CPU 2 controls the power receiving adaptor 200.

The coaxial power receiving section 220 receives electric power from the coaxial power supplying section 120 by way of the coaxial cable 30. The coaxial power receiving section 220 converts a received DC voltage into a DC voltage used in the multi-carrier communication section 210 and supplies electric power to the multi-carrier communication section 210. The coaxial power receiving section 220 is electrically connected to the (PoE) power supply section 230, either. The coaxial power receiving section 220 supplies the received electric power, as it is, to the (PoE) power supply section 230 or converts the power into a voltage, as necessary, and supplies the thus-converted DC voltage to the (POE) power supply section 230.

The (PoE) power supply section 230 supplies electric power to the network camera 20 by way of the Ethernet (Registered Trademark) cable 240. The (PoE) power supply section 230 checks whether or not the network camera 20 is a PoE-compatible electric device and then starts supplying electric power to the network camera.

PoE is a technique for supplying electric power by utilization of the Ethernet (Registered Trademark) cable and is used primarily for an electric device to be installed at a location where difficulty is encountered in supplying power to the electric device. For instance, since the network camera 20 shown in FIG. 1 is usually secured to a ceiling, difficulty is encountered in supplying electric power to the network camera. Therefore, the network camera 20 is supplied with electric power by utilization of the Ethernet (Registered Trademark) cable 240.

As described above, through use of the power supply adaptor 100 and the power receiving adaptor 200, the network camera 20 can be connected to the IP network by utilization of the coaxial cable 30. Specifically, the network camera 20 can be connected to the IP network connected to the television set 10 by utilization of the existing coaxial cable 30 without newly laying an Ethernet (Registered Trademark) cable. Further, the network camera 20 negates a necessity to receive electric power from the receptacle.

For instance, when there is an existing coaxial cable 30 that was previously used but is not currently used, the network camera 20 can be readily connected to the IP network by use of the existing coaxial cable 30.

Another different example is that there is an existing coaxial cable 30 which connects the television set 10 to an antenna (not shown). In this case, the antenna and the coaxial cable 30 are disconnected from each other. The power supply adaptor 100 is connected between one end of the coaxial cable 30 and the television set 10. The power receiving adaptor 200 is connected between the other end of the coaxial cable 30 and the network camera 20. Thereby, the network camera 20 can be readily connected to the IP network by utilization of the existing coaxial cable 30 and also receive electric power by way of the coaxial cable 30. Connecting the network camera to the IP network is performed not only by way of the television set 10 but also by way of the power supply adaptor 100. For instance, the power supply adaptor 100 can also be connected directly to the IP network by way of the Ethernet (Registered Trademark) cable 140 or by way of a power line electrically connected to the power plug 131. The network camera 20 can also be connected directly to the IP network by way of the Ethernet (Registered Trademark) cable 240 or another Ethernet (Registered Trademark) cable differing from the Ethernet (Registered Trademark) cable 240.

Still another example is that, when there is an existing coaxial cable 30 for connecting the television set 10 to an analogue monitoring camera (not shown), the network camera 20 can be readily exchanged with the analogue monitoring camera. The network camera 20 is attached to the position where the analogue monitoring camera was secured and also connected to the exiting coaxial cable 30 by way of the power receiving adaptor 200. As a matter of course, the power supply adaptor 100 is electrically connected between the television set 10 and the coaxial cable 30, and the power receiving adaptor 200 is electrically connected between the coaxial cable 30 and the network camera 20.

Since the existing coaxial cable 30 can be utilized as a transmission channel and a supply line as mentioned above, initial investments which would be required for electric wiring, communication wiring, and the like, can consequently be curtailed, Further, realization of an IP-based interconnection among communication devices can be pursued by effective utilization of the existing environment.

As mentioned above, the network camera 20 is fed with electric power from the power receiving adaptor 200. Therefore, the network camera 20 can be readily installed at a location where a power outlet, like a receptacle, is not available nearby.

In the present embodiment, the explanations have been given by means of taking the network camera 20 as the example second electric device. In addition to this, a switching hub, a wireless LAN access point, an IP phone, an antenna, and the like, can also be utilized as the second electric devices. In addition to the television set 10, a PC, a digital recorder, a printer, a multifunction machine, an IP phone, and others, can also be utilized likewise as the first electric devices. Although the power supply adaptor 100 and the power receiving adaptor 200 are disposed separately from each other in the present embodiment, they can also be built into the television set (the first electric device) 10 and the network camera (the second electric device) 20, respectively.

Figure 2:
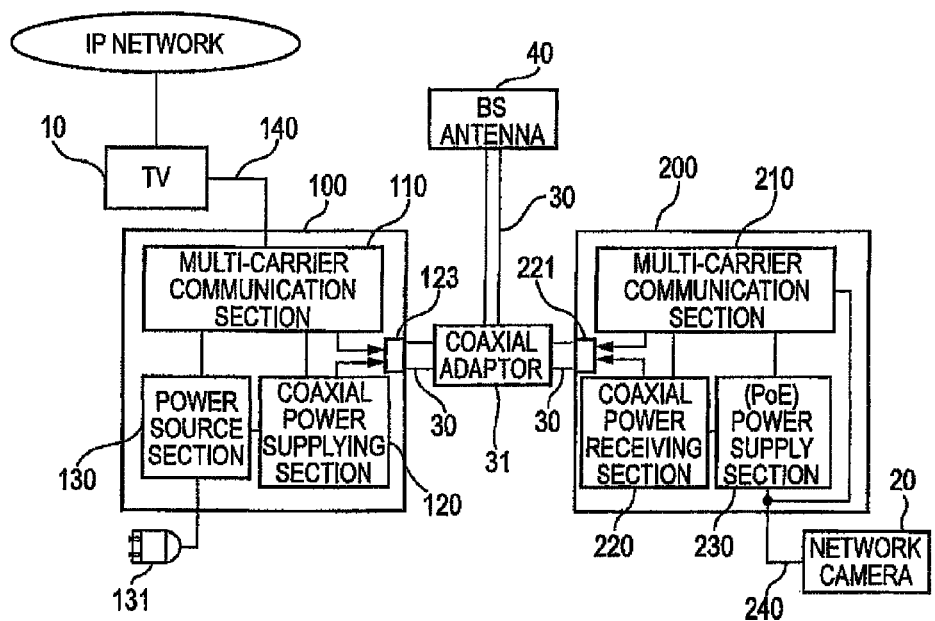
FIG. 2 is an illustration showing an example in which the power supply adaptor of the embodiment is incapable of supplying electric power to the power receiving adaptor.

Turning to FIG. 2, an explanation is now given to a case where electric power cannot be fed from the power supply adaptor 100 to the power receiving adaptor 200. FIG. 2 is an illustration showing an example in which power supply adaptor 100 of the embodiment is incapable of supplying electric power to the power receiving adaptor 200. The configuration shown in FIG. 2 corresponds to an addition of a coaxial adaptor 31 and a BS antenna 40 (an electric device) to the configuration shown in FIG. 1. Explanations about members of the configuration equal to their counterparts shown in FIG. 1 are omitted.

The coaxial adaptor 31 interconnects the plurality of coaxial cables 30. The power supply adaptor 100, the power receiving adaptor 200, and the electric device (does not always require a communication capability) are electrically connected together by way of the coaxial cables 30 and the coaxial adaptor 31.

The BS (Broadcasting Satellite) antenna 40 is an antenna that receives a satellite broadcast. The television set 10 outputs videos and sounds received by the BS antenna 40.

In the state shown in FIG. 2, the coaxial cables 30 are shared among the power supply adaptor 100, the power receiving adaptor 200, and the BS antenna 40 (the electric device). The power supply adaptor 100 at this time applies a voltage to the coaxial cables 30 and also transmits a multicarrier signal to the coaxial cables. Therefore, the power supply adaptor 100 may affect communication between the television set 10 and the BS antenna 40. For instance, when an operating frequency band for communication established between the power supply adaptor 100 and the power receiving adaptor 200 and an operating frequency band for transmission of data between the BS antenna 40 and the television set 10 are close to each other, the communication between the power supply adaptor 100 and the power receiving adaptor 200 may hinder transmission of data between the BS antenna 40 and the television set 10. Since the power supply (PoE) circuit 230 supplies electric power to the network camera 20 by utilization of PoE, a large voltage is required. For this reason, the coaxial supplying section 120 supplies a large voltage to the coaxial power receiving section 220. Specifically, a large voltage is applied to the coaxial cables 30. A large voltage is thereby applied to the BS antenna 40 sharing the coaxial cables 30, which may cause a breakdown in the BS antenna 40.

Therefore, when the coaxial cables 30 are linked to another system (a system existing between the television set 10 and the BS antenna 40 in FIG. 2), it is not desirable to supply electric power between the power supply adaptor 100 and the power receiving adaptor 200.

Accordingly, before starting supplying electric power to the power receiving adaptor, the power supply adaptor 100 of the present embodiment detects whether or not there is a live part (i.e. detects whether or not an electric potential having a threshold value or more exists in the coaxial cables 30). It is thereby determined whether or not the electric device (e.g., the BS antenna 40) is electrically connected to the coaxial cables 30. Even if a live part is detected, the power supply adaptor 100 will not start supplying electric power to the power receiving adaptor 200 (bring the power receiving adaptor into an unfed state).

Figure 3:
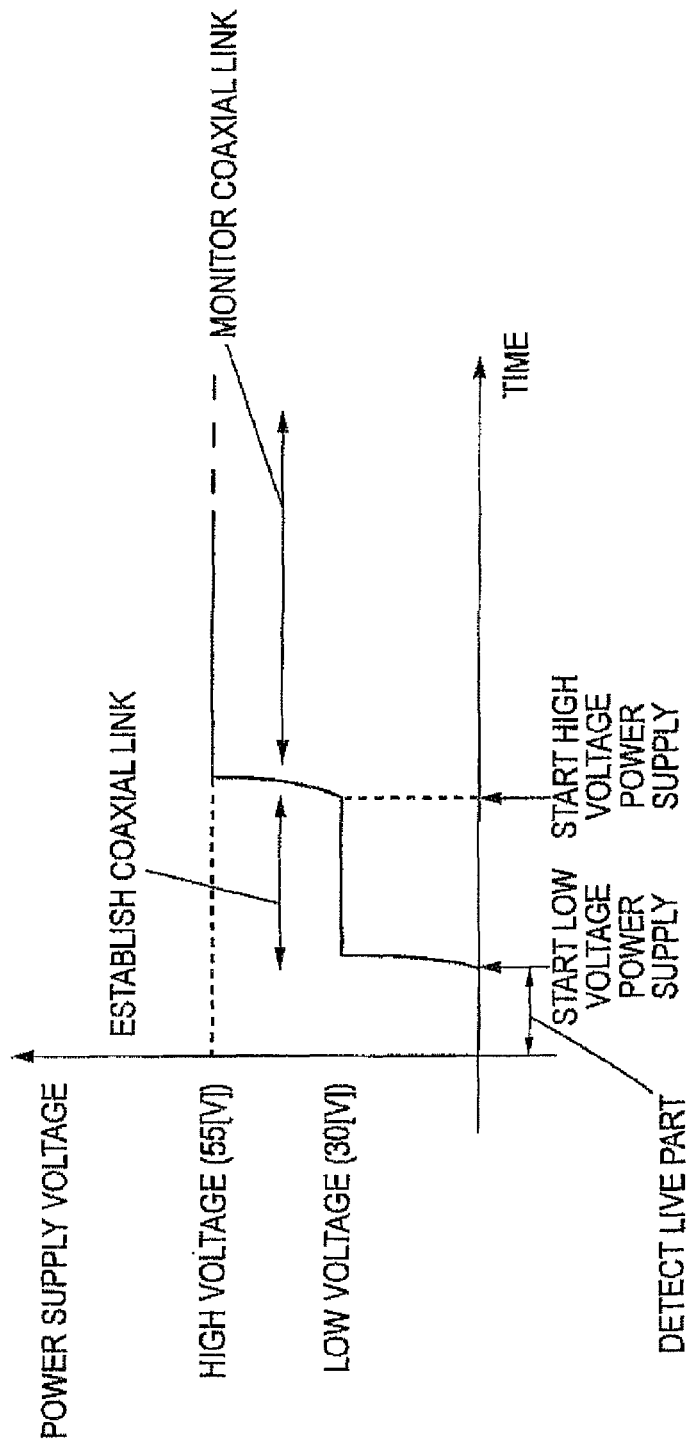
FIG. 3 is a graph for describing an overview of a power supplying method of the embodiment.

Referring to FIG. 3, an overview of the method for supplying electric power from the power supply adaptor 100 to the power receiving adaptor 200 is now described. FIG. 3 is a view for describing an overview of the power supplying method of the embodiment.

As mentioned above, the power supply adaptor 100 first detects a live part. If the live part is not detected, the power supply adaptor 100 starts supplying a first voltage (a low voltage) to the power receiving adaptor 200. The essential requirement for the first voltage is to be equal to or larger than the minimum voltage required for the power receiving adaptor 200 to operate. The power receiving adaptor 200 thereby becomes operable, and the power supply adaptor 100 authenticates the power receiving adaptor 200. When the power supply adaptor 100 can ascertain that a destination of power supplying is the rechargeable power receiving adaptor 200, a link is established between the power supply adaptor 100 and the power receiving adaptor 200 by means of the coaxial cables 30 (establishment of a coaxial link). The power supply adaptor 100 thereby starts supplying a second voltage (a high voltage) to the power receiving adaptor 200, whereupon the power receiving adaptor 200 becomes able to start supplying PoE electric power to the network camera 20. Communication with the power supply adaptor 100 that is faster than that established during supplying of the first voltage becomes feasible. After supplying of a high voltage has started, the power supply adaptor 100 monitors the coaxial link with the power receiving adaptor 200. When became unable to ascertain the coaxial link, the power supply adaptor 100 suspends supplying of power to the power receiving adaptor 200.

In the present embodiment, the low voltage (the first voltage) is set to 30V as shown in FIG. 3, and the high voltage (the second voltage) is set to 55V. However, the voltages are not limited to these values. The minimum requirement for the low voltage is less than 42V, and the minimum requirement for the high voltage ranges from 42 to 60V. The maximum working voltage of a common communication cable is 60V or less. As described above, the power supply adaptor 100 and the power receiving adaptor 200 are sometimes connected together by way of the long coaxial cables 30. The power supply adaptor 100 makes communication with the power receiving adaptor 200 by way of the coaxial cables 30. Therefore, applying the highest possible voltage to the coaxial cables 30 is preferable. Stable long distance communication can be carried out by applying a high voltage to the coaxial cables 30. Consequently, it is desired that the power supply adaptor 100 should supply a high voltage to the power receiving adaptor 200. Moreover, since the power receiving adaptor 200 supplies PoE electric power to the network camera 20, at least a voltage of 44V or more must be fed.

Accordingly, in the present embodiment, the power supply adaptor 100 temporarily supplies a low voltage to the power receiving adaptor 200, thereby starting the power receiving adaptor 200. The power supply adaptor 100 can thereby ascertain whether or not the started device can be fed with a high voltage. Put another word, the power supply adaptor 100 establishes a coaxial link with the power receiving adaptor 200. After having established the coaxial link, the power supply adaptor 100 starts supplying a high voltage to the power receiving adaptor 200. Consequently, long distance high-speed communication can be safely carried out, and a high voltage can be fed. Moreover, the coaxial link is monitored even after supplying a high voltage has started. Therefore, even if the connections among the power supply adaptor 100, the coaxial cables 30, and the power receiving adaptor 200 are broken, leakage of a high voltage from the coaxial cables 30 can be prevented.

Figure 4:
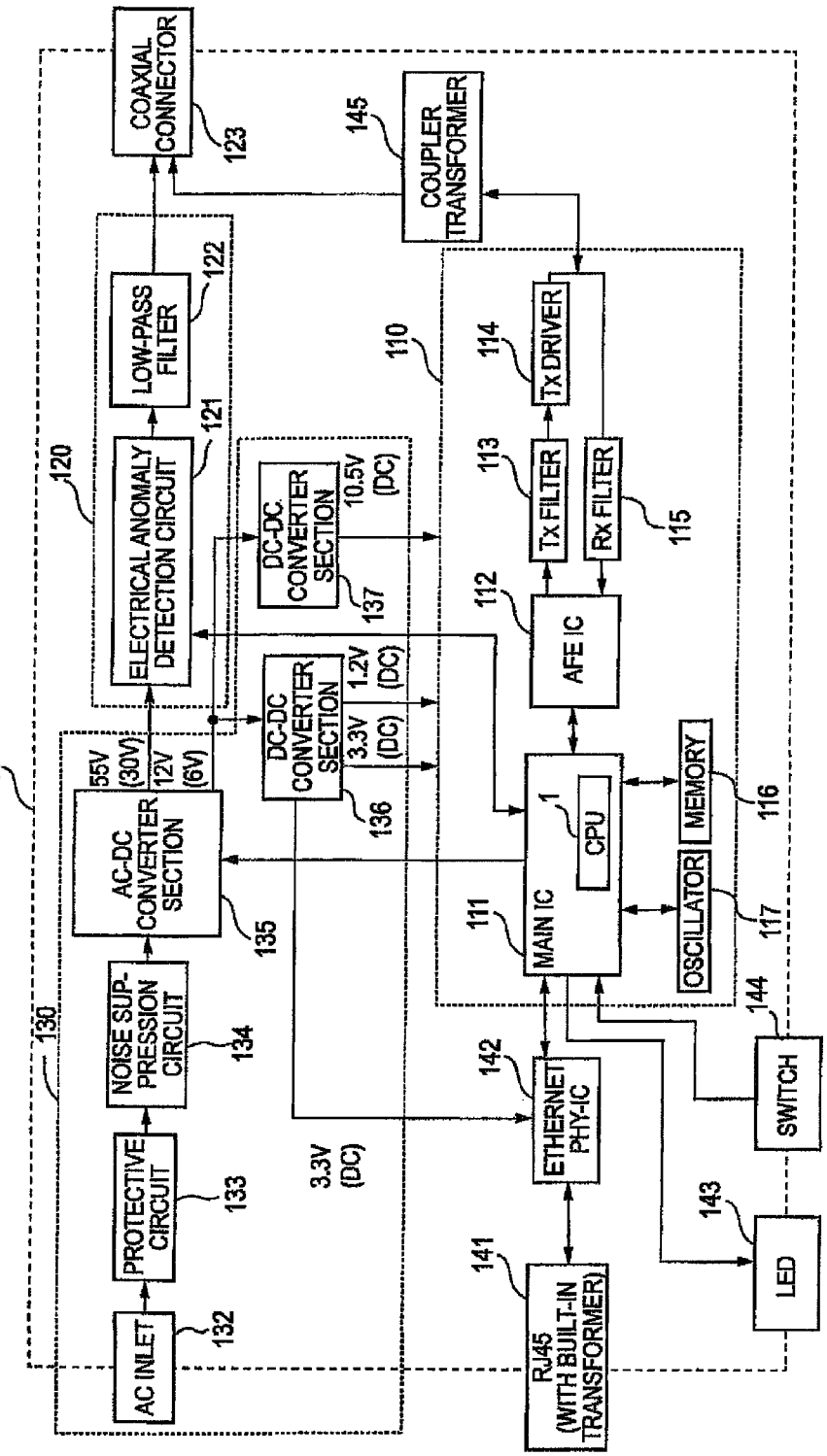
FIG. 4 is a section diagram showing example hardware of the power supply adaptor of the embodiment.

Hardware of the power supply adaptor 100 is now described by reference to FIG. 4. FIG. 4 is a section diagram showing example hardware of the power supply adaptor 100 of the present embodiment. A main IC 111 of the multi-carrier communication section 110 includes the CPU 1.

First, the power source section 130 is described.

An AC inlet 132 is an interface for supplying a commercial power supply (an AC voltage) fed from the outside to the power supply adaptor 100. The AC inlet 132 is connected to the power plug 131.

A protective circuit 133 has a fuse, and a surge absorber and protects the power supply adaptor 100 from an over-voltage and an over-current. If a large current flows into the fuse provided in the protective circuit 133, the fuse will be melted, thereby preventing flow of a large current to the power supply adaptor 100. The surge absorber protects the power supply adaptor 100 from an over-voltage which would be caused by; for instance, a thunder, an electrostatic discharge, switching action, and the like.

A noise suppression circuit 134 has an X capacitor and a common mode choke coil and absorbs noise in the power supply adaptor 100. The X capacitor absorbs; for instance, noise stemming from switching action of an AC-DC converter section 135. The X capacitor thereby prevents discharge of switching noise from the AC inlet 132 to the commercial power source. Further, the common mode choke coil absorbs common mode noise.

The AC-DC converter section (a supply voltage generation section) 135 converts a received AC voltage into two types of DC voltages. One type of the DC voltages is a DC voltage to be fed to the coaxial power supplying section 120, and the other type of the DC voltages is a DC voltage to be fed to the multi-carrier communication section 110. According to a command from the CPU 1, the AC-DC converter section 135 switches a value of the voltage to be generated. For instance, when the AC-DC converter section 135 is supplying a low voltage (30V) to the coaxial power supplying section 120, the voltage fed to the coaxial power supplying section 120 is switched to a high voltage (55V). The AC-DC converter section 135 switches a DC voltage to be fed to the multi-carrier communication section 110 in synchronism with switching between the low voltage and the high voltage. Specifically, when the AC-DC converter section 135 generates the low voltage (30V), a DC 6V voltage for the multi-carrier communication section 110 is generated. When the AC-DC converter section 135 generates a high voltage (55V), a DC 12V voltage for the multi-carrier communication section 110 is generated. These two voltage values are not particularly limited.

A DC-DC converter section 136 converts the DC voltage into a predetermined DC voltage used in the power supply adaptor 100. Detailed supplemental remarks are as follows: The DC-DC converter section 136 converts the DC 6V or 12V voltage generated by the AC-DC converter section 135 into a DC 3.3V voltage and a DC 1.2V voltage. In order to activate the multi-carrier communication section 110, the DC-DC converter section 136 supplies the DC 3.3V voltage and the DC 1.2V voltage to the multi-carrier communication section 110. Further, the DC-DC converter section 136 supplies the DC 3.3V voltage to an Ethernet (Registered Trademark) PHY-IC 142.

A DC-DC converter section 137 also converts the DC voltage into a predetermined DC voltage used by the multi-carrier communication section 110. Detailed supplemental remarks are as follows: The DC-DC converter section 137 converts the DC 12V voltage generated by the AC-DC converter section 135 into a DC 10.5V voltage. The DC-DC converter section 137 supplies the DC 10.5V voltage to the multi-carrier communication section 110. Further, when the AC-DC converter section 135 generates a DC 6V voltage, the DC-DC converter section 137 does not convert the DC voltage and supplies the DC 6V voltage to the multi-carrier communication section 110.

The coaxial power supplying section 120 and the coaxial connector 123 are now described. The coaxial power supplying section 120 has an electrical anomaly detection circuit 121 and a low-pass filter 122 and a capability of supplying a voltage fed from the power source section 130 to the coaxial cables 30.

The electrical anomaly detection circuit 121 has a capability of controlling power supply to the power receiving adaptor 200 and detects various electrical anomalies (including previously-described detection of a live part). The electrical anomalies are roughly divided into medium-side anomalies (an anomaly assumed to have arisen outside the power supply adaptor 100; for instance, a live part, an over-current, and the like) and adaptor-side anomalies (anomalies assumed to have arisen in the power supply adaptor 100; for instance, an over-voltage, a critical voltage, and others). A live part resulting from an electrical device being connected to the coaxial cables 30 outside the power supply adaptor 100 is a medium-side anomaly. Upon detection of occurrence of an electrical anomaly, the electrical anomaly detection circuit 121 notifies the anomaly to the main IC 111. Detection of an over-current, detection of an over-voltage, detection of a critical voltage correspond to detection of an electric current equal to or larger than a threshold value or detection of a voltage equal to or larger than a threshold value. They will be described in detail in connection with a third embodiment.

The low-pass filter 122 absorbs noise of a power supply voltage generated by the AC-DC converter section 135. The coaxial connector 123 is an interface that can be connected to the coaxial cables 30. The power supply voltage generated by the AC-DC converter section 135 is delivered to the coaxial cables 30 by way of the electrical anomaly detection circuit 121, the low-pass filter 122, and the coaxial connector 123.

The multi-carrier communication section 110, a modular jack (including a built-in transformer) 141 for use with a LAN, like RJ45, the Ethernet (Registered Trademark) PHY-IC 142, and a coupler transformer 145 are now described.

The main IC 111 includes the CPU 1, a MAC (Media Access Control Layer) section (not shown), and a PHY (Physical Layer) section (not shown).

The CPU 1 is equipped with a 32-bit RISC (Reduced Instruction Set Computer) processor. The MAC section manages a MAC (Media Access Control layer) of a transmitted/received signal, and the PHY section manages a PHY (Physical layer) of the transmitted/received signal. The CPU 1 controls operation of the MAC section and the PHY section by utilization of data stored in memory 116, and also controls the entirety of the power supply adaptor 100. The CPU 1 notifies the AC-DC converter control section 135 of switching between the low voltage and the high voltage.

An AFE-IC 112 is equipped with an un-illustrated DA converter (DAC: D/A Converter), an AD converter (ADC: A/D Converter), and a variable amplifier (VGA: Variable Gain Amplifier). The DA converter (DAC) converts a digital signal into an analogue signal; the AD converter (ADC) converts an analogue signal into a digital signal; and the variable amplifier (VGA) controls a gain.

The coupler transformer 145 superimposes a multi-carrier transmission signal generated by the multi-carrier communication section 110 on to the coaxial cable 30 connected to the coaxial connector 123. The coupler transformer 145 extracts a multi-carrier received signal superimposed on the coaxial cable 30, as well.

The memory 116 stores a program and an IP address used by the main IC 111. An oscillator 117 oscillates a clock signal at a given wavelength.

The modular jack (having a built-in transformer) 141 is an interface that allows insertion of the Ethernet (Registered Trademark) cable 140. The power supply adaptor 100 and the television set 10 are connected together by use of the Ethernet (Registered Trademark) cable 140, to thus become communicable. The transmission data (IP data) input from the modular jack (having a built-in transformer) 141 are sent to the main IC 111 by way of the Ethernet (Registered Trademark) PHY-IC 142. The main IC 111 subjects the transmission data to digital signal processing, thereby generating a digital (multi-carrier) transmission signal. The DA converter (DAC) of the AFE-IC 112 converts the digital transmission signal into an analogue (multi-carrier) transmission signal. The thus-converted signal is sent to the power receiving adaptor 200 by way of a Tx filter 113, a Tx driver 114, the coupler transformer 145, the coaxial connector 123, and the coaxial cables 30.

The multi-carrier received signal received from the coaxial cable 30 is sent to an Rx filter 115 by way of the coupler transformer 145. The multi-carrier received signal is subjected to gain control in the variable amplifier (VGA) of the AFE-IC 112 and then converted into a digital signal by the AD converter (ADC). The thus-converted digital signal is sent to the main IC 111, where the signal is converted into received data (IP data) through digital signal processing. The thus-converted received data are output from the modular jack (having a built-in transformer) 141 by way of the Ethernet (Registered Trademark) PHY-IC 142.

Example digital signal processing implemented by the main IC 111 is now described. The main IC 111 uses a multi-carrier signal, like an OFDM (Orthogonal Frequency Division Multiplexing) signal, generated by use of a plurality of sub-carriers as a transmission signal. The main IC 111 converts data (IP data) to be transmitted into a multi-carrier transmission signal, like an OFDM signal, and outputs the thus-converted IP data. Further, the main IC 111 processes a multi-carrier received signal, like an OFDM signal, whereby the signal is converted into received data (IP data). Digital signal processing for the converting operations is primarily performed in the PHY section.

An LED 143 and a switch 144 are now described.

The LED 143 is disposed so as to be visible from the outside of the power supply adaptor 100 and is illuminated or extinguished (and also blinked) under the command from the CPU 1 included in the main IC 111. The LED 143 thereby notifies the user of the status of the power supply adaptor 100; for instance, a result of a determination as to whether or not the power receiving adaptor 200 can be fed with electric power, occurrence of a trouble during power supplying operation, and the like. The LED 143 has a speed meter function, too. The LED 143 is provided in numbers, and the CPU 1 notifies the user of current speed of communication between the power supply adaptor 100 and the power receiving adaptor 200 by changing the number of illuminated LEDs 143. For instance, when one LED 143 is illuminated, the current communication speed is 10 MHz or more and under 20 MHz. When two LEDs 143 are illuminated, the current communication speed is 20 MHz or more and under 30 MHz. When three LEDs 143 are illuminated, the current communication speed is 30 MHz or more. Alternatively, a speed and a trouble report may also be provided in different display forms by means of changing a color and a blink rate of the LEDs 143. Further, the trouble report may also be displayed on the television set 10 by way of the Ethernet (Registered Trademark) PHY-IC 142, the modular jack (with a built-in transformer) 141, and the Ethernet (Registered Trademark) cable 140 or provided on the television set 10 by a sound.

The switch 144 is used when the user operates the power supply adaptor 100. For instance, the switch 144 is displayed as a speed meter on the LED 143 or used for initializing an IP address stored in the memory 116 (i.e., at the time of factory shipment).

Figure 5:
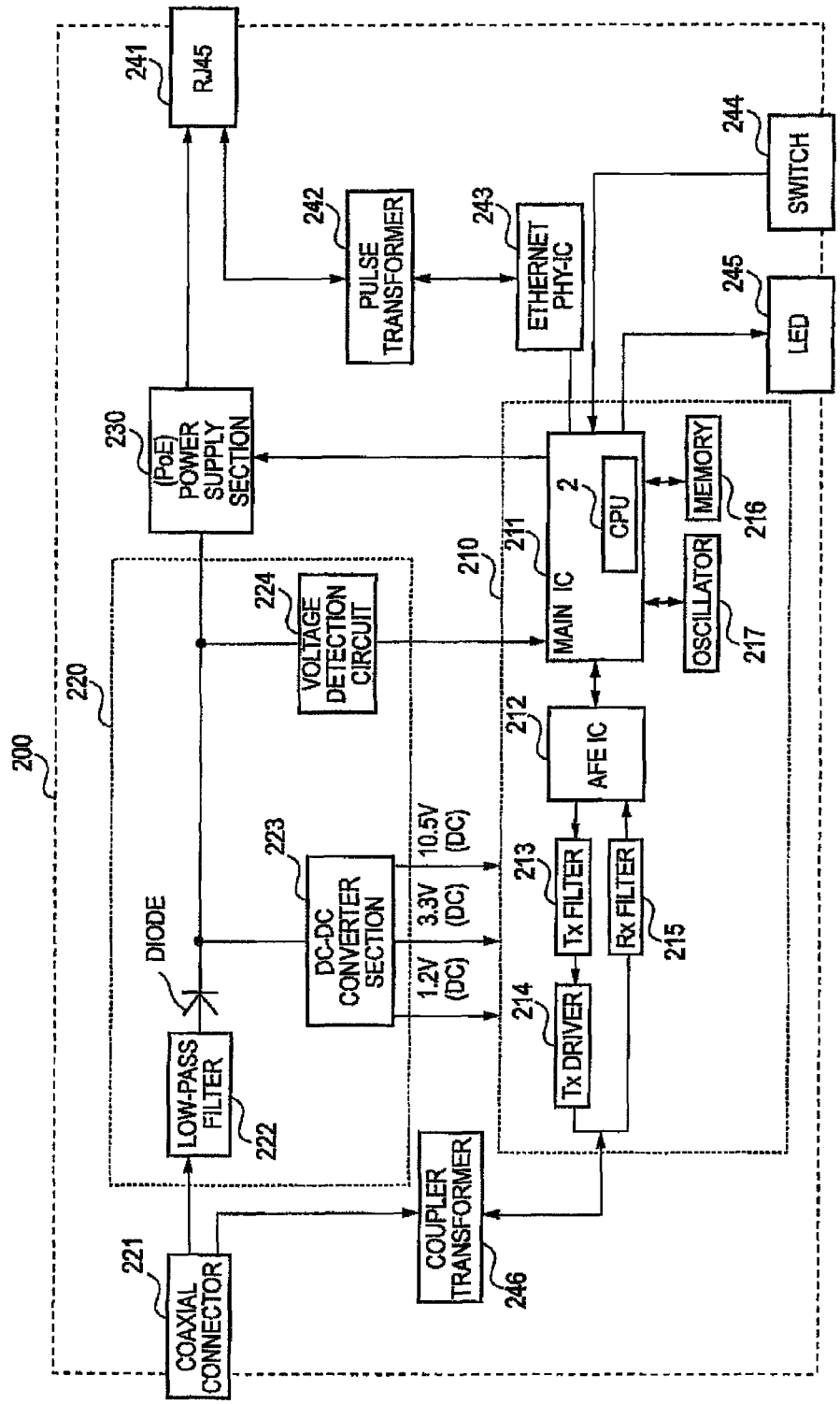
FIG. 5 is a section diagram showing example hardware of the power receiving adaptor of the embodiment.

By reference to FIG. 5, example hardware of the power receiving adaptor 200 is now described. FIG. 5 is a section diagram showing example hardware of the power receiving adaptor 200 of the embodiment. A main IC 211 of the multi-carrier communication section 210 includes the CPU 2.

The coaxial connector 221 is an interface that can be connected to the coaxial cable 30. A low-pass filter 222 absorbs noise in a voltage received by way of the coaxial cable 30. A diode immediately following the low-pass filter 222 prevents occurrence of a backflow of an electric current.

A DC-DC converter section 223 converts the received voltage into a predetermined DC voltage required for the multi-carrier communication section 210. Specifically, a DC 10.5V voltage is generated from a received 30V or 55V voltage. A DC 3.3V voltage and a DC 1.2V voltage are subsequently generated from the DC 10.5V voltage. The DC-DC converter section 223 supplies the DC 1.2V voltage, the DC 3.3V voltage and the DC 10.5V voltage to the multi-carrier communication section 210. A voltage detection circuit 224 detects switching between the low voltage and the high voltage and reports occurrence of switching to the main IC 211.

The (PoE) power supply section 230 supplies the received voltage to the network camera 20 by means of PoE and by way of the Ethernet (Registered Trademark) cable 240.

A modular jack 241 is an interface that enables insertion of the Ethernet (Registered Trademark) cable 240. A pulse transformer 242 shuts off a DC voltage. The (PoE) power supply section 230 supplies electric power to the network camera 20 by way of the modular jack 241, and hence the pulse transformer 242 is not incorporated in the modular jack 241 and provided separately.

The multi-carrier communication section 210 corresponds to the multi-carrier communication section 110, and its detailed explanation is omitted. A coupler transformer 246 superposes a multi-carrier transmission signal on the coaxial cable 30 and also extracts a multi-carrier received signal superposed on the coaxial cable. The coupler transformer 246 extracts the multi-carrier signal transmitted from the coaxial cable 30, and the multi-carrier communication section 210 converts the multi-carrier signal into IP data. The IP data are transmitted to the network camera 20 by way of an Ethernet (Registered Trademark) PHY-IC 243, the pulse transformer 242, the modular jack 241, and the Ethernet (Registered Trademark) cable 240.

Like the switch 144, a switch 244 is a switch for initializing an IP address stored in memory 216. On-off switching of PoE supplying is also set by the switch 244. When the switch 244 switches PoE supplying to the OFF position, the CPU 2 in the main IC 211 notifies the (PoE) power supply section 230 to stop PoE supplying. For instance, when a power supply section, like a receptacle, is in the vicinity of the network camera 20, the power receiving adaptor 200 does not need to unnecessarily supply PoE electric power to the network camera 20. Since PoE supplying is heavily consumed by the coaxial cable 30, electric power equivalent to the quantity of power which would be consumed can be effectively utilized when PoE supplying is not carried out. Therefore, when compared with a case where PoE supplying is carried out, a critical distance over which power can be fed by use of the coaxial cable 30 can be made longer when PoE supplying is not carried out.

An LED 245 is disposed so as to be visible from the outside of the power receiving adaptor 200. Under the command from the CPU 2 included in the main IC 211, the LED 245 is illuminated and extinguished. The LED 245 thereby notifies the user of the status of the power receiving adaptor 200.

First Embodiment

Figure 6:
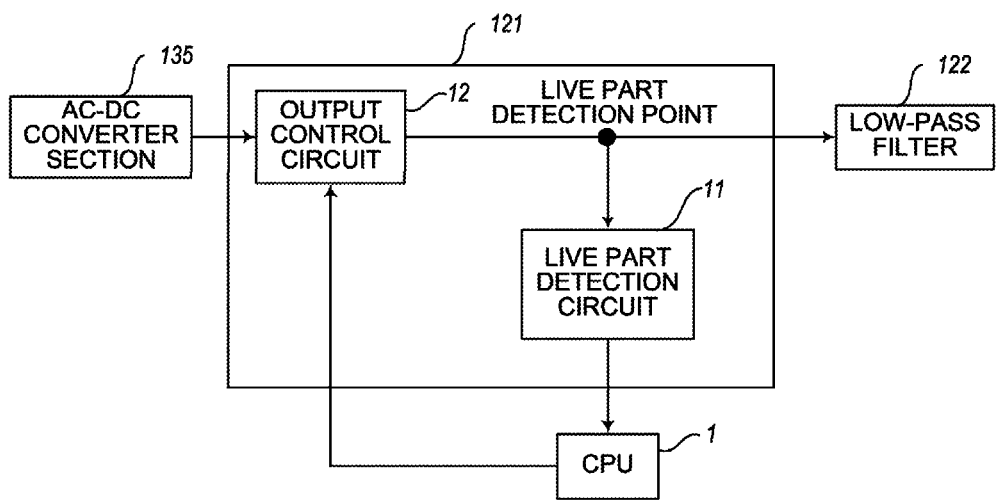
FIG. 6 is a section diagram showing a configuration of an electrical anomaly detection circuit of a first embodiment.
Figure 7:
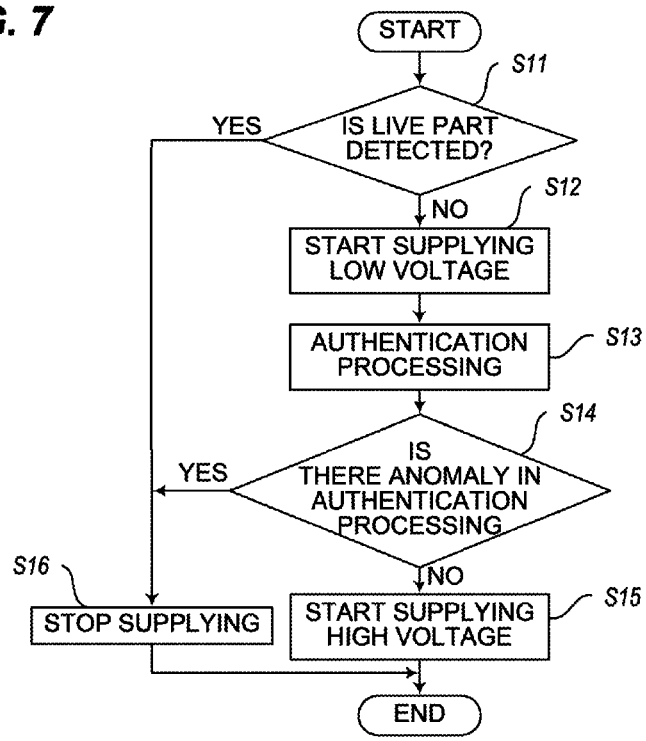
FIG. 7 is a flowchart for commencing power supplying in the first embodiment.

A first embodiment is hereunder described by reference to FIGS. 6 and 7. FIG. 6 is a section diagram showing a configuration of the electrical anomaly detection circuit 121 of the first embodiment. FIG. 7 is a flowchart for commencing power supplying in the first embodiment.

First, the configuration of the electrical anomaly detection circuit 121 of the present embodiment is described by reference to FIG. 6.

A live part detection circuit 11 detects an electric potential at a live part detection point and notifies the CPU 1 of the thus-detected electric potential. The CPU 1 thereby determines whether or not there is a live part. Alternatively, the live part detection circuit 11 can detect whether or not there is a live part and notify the CPU 1 of presence or absence of the live part. An output control circuit 12 has an FET (Field Effect Transistor) and controls on-off switching of power supplying to the power receiving adaptor 200. The output control circuit 12 in an initial state remains in a state of no power supplying. When determined that there is not a live part, the CPU 1 switches the output control circuit 12 to a state of power supplying. A power supply voltage sent from the AC-DC converter section 135 thereby passes through the output control circuit 12, to thus be fed to the power receiving adaptor 200 by way of the low-pass filter 122, the coaxial connector 123, and the coaxial cable 30.

Flow of processing performed before the power supply adaptor 100 starts supplying a high voltage to the power receiving adaptor 200 is now described by reference to FIG. 7.

In step S11, the live part detection circuit 11 detects a live part. The output control circuit 12 remains in a state of no power supplying at this point in time. Since the live part detection circuit 11 detects an electric potential of a medium, an electric potential of the live part detection point is detected. When not detected an electric potential having a threshold value or more, the live part detection circuit 11 notifies the CPU 1 that there is not any live part (processing proceeds to step S12). When detected an electric potential having a threshold value or more, the live part detection circuit 11 notifies the CPU 1 that there is a live part (processing proceeds to step S16). The threshold value for determining presence or absence of a live part is set to; for instance, 6 to 8V.

In step S12, the CPU 1 brings the output control circuit 12 into a state of power supplying in order to start supplying a low voltage. The coaxial power supplying section 120 starts supplying a low voltage to the power receiving adaptor 200. The power receiving adaptor 200 is thereby started, so that the multi-carrier communication section 210 oscillates a beacon toward the power supply adaptor 100. The CPU 1 thereby ascertains startup of the power receiving adaptor 200.

In step S13, the CPU 1 performs authentication processing along with the CPU 2 of the power receiving adaptor 200. The CPU 1 requests authentication of the CPU 2, and the CPU 2 makes an answer in response to the authentication request.

When the CPU 1 determines in step S14 that no anomaly exists in authentication processing performed in step S13, processing proceeds to step S15 (a coaxial link is established). When the CPU 1 determines that an anomaly exists in authentication processing, processing proceeds to step S16.

In step S15, a live part is not detected, and an anomaly is also not determined to exist in authentication processing; hence, the CPU 1 commands the AC-DC converter section 135 to perform switching between a low voltage and a high voltage. The AC-DC converter section 135 thereby produces a high voltage. The coaxial power supplying section 120 thereby starts supplying a high voltage to the power receiving adaptor 200.

In step S16, the CPU 1 commands the coaxial power supplying section 120 to stop supplying the low voltage. When a live part is detected in step S11, the coaxial power supplying section 120 does not start supplying a low voltage to the power receiving adaptor 200. When an anomaly is detected to exist in authentication processing in step S14, the CPU 1 brings the output control circuit 12 into a state of no power supplying. The coaxial power supplying section 120 thereby stops supplying the low voltage to the power receiving adaptor 200.

When the power supply adaptor 100 starts supplying a high voltage, the voltage detection circuit 224 of the power receiving adaptor 200 detects occurrence of switching of the received voltage to a high voltage and notifies the CPU 2 of the switching operation. The CPU 2 thereby notifies the (PoE) power supply section 230 of occurrence of switching of the voltage. The (PoE) power supply section 230 thereby starts supplying PoE electric power to the network camera 20. The network camera 20 thereupon starts up to become operable; hence, the network camera 20 and the television set 10 become communicable.

It is difficult to determine whether or not an electric potential developing in the live part detection point after commencement of power supplying is an electric potential caused by the medium or an electric potential caused by the power supply adaptor 100. Therefore, there is no problem in periodically, temporarily suspending a power supply even after commencement of power supplying, to thus detect a live part. Provided that an electric device (e.g., the BS antenna 40 or the like) is connected to the coaxial cable 30 after commencement of power supplying, the electrical device can be detected. Detection of a live part is periodically performed, whereby safer power supplying can be carried out. Here the word "periodic" can signify temporal limitations or limitations on a volume of data exchanged between the power supply adaptor 100 and the power receiving adaptor 200.

Second Embodiment

Figure 8:
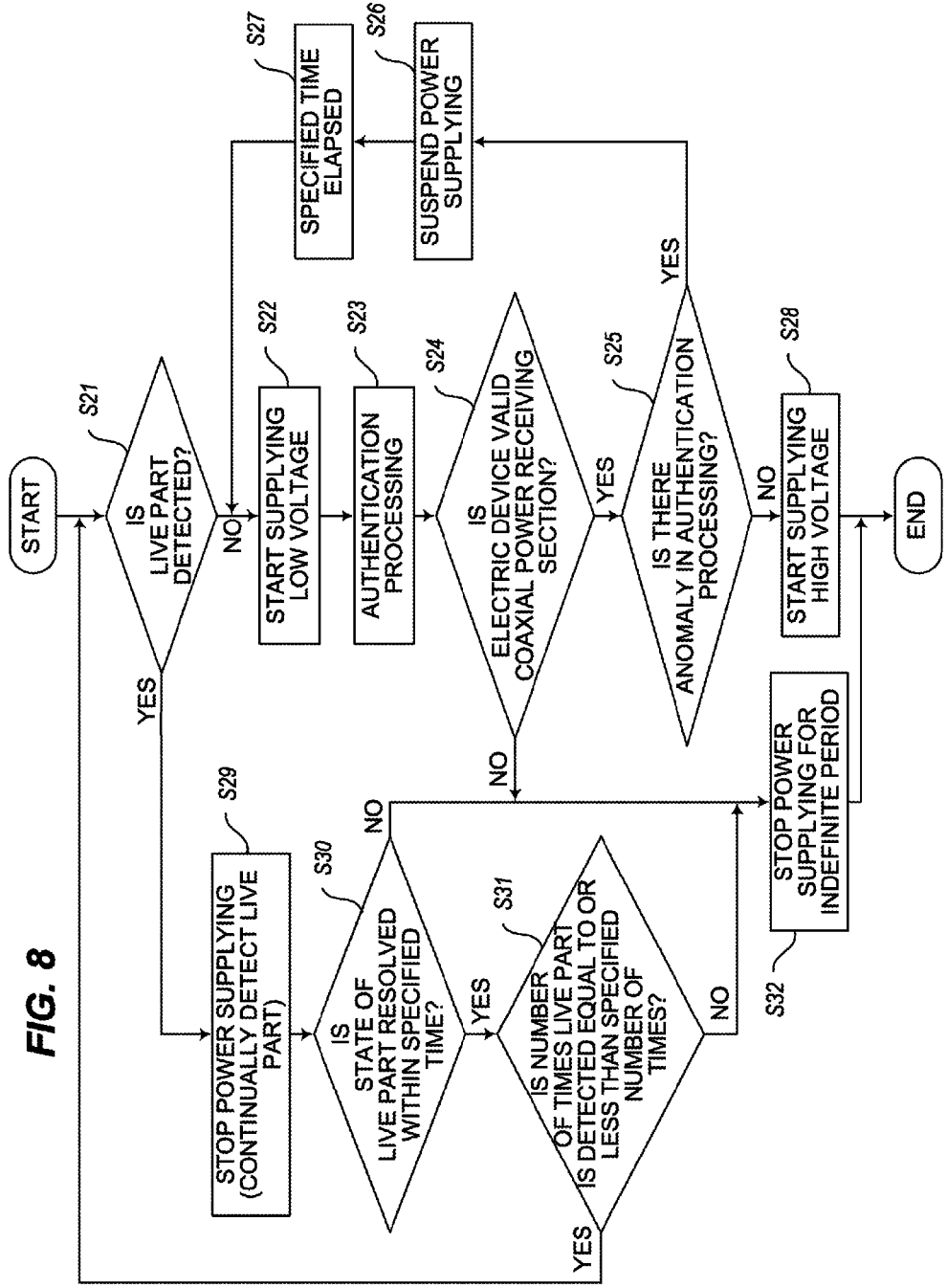
FIG. 8 is a flowchart for commencing power supplying in a second embodiment.

A second embodiment is hereunder described by reference to FIG. 8. FIG. 8 is a flowchart for starting power supplying in the second embodiment. A difference between the present embodiment and the first embodiment lies in that a retry is performed after a stop of power supplying and that, when power supplying cannot be performed as a result of performance of a retry, power supplying is stopped for an indefinite period. Members having the same configuration and function as those of the first embodiment are assigned the same reference numerals, and their detailed explanations are omitted.

In step S21, the live part detection circuit 11 detects a live part. In order to detect an electric potential of the medium, the live part detection circuit 11 detects an electric potential of the live part detection point. When not detected an electric potential having a threshold value or more, the live part detection circuit 11 notifies the CPU 1 of absence of a live part (processing proceeds to step S22). In contrast, when detected an electric potential having a threshold value or more, the live part detection circuit 11 notifies the CPU 1 of presence of a live part (processing proceeds to step S29). A threshold value used for determining whether or not there is a live part is set to; for instance, 6 to 8V.

In order to start supplying a low voltage, the CPU 1 brings the output control circuit 12 into a state of power supplying in step S22, and the coaxial power supplying section 120 starts supplying a low voltage to the power receiving adaptor 200. The power receiving adaptor 200 is thereupon started, and the multi-carrier communication section 210 oscillates a beacon. The CPU 1 thereby ascertains start-up of the power receiving adaptor 200.

In step S23, the CPU 1 performs authentication processing to determine whether to supply a high voltage to the electric device that is a destination of a power supply. The CPU 1 requests authentication of the CPU 2 of the power receiving adaptor 200, and the CPU 2 makes an answer in response to the request for authentication.

In step S24, the CPU 1 determines, from a result of authentication performed in connection with step S23, whether or not the electric device that is a destination of a power supply is a valid coaxial power receiving section 220. The word "valid coaxial power receiving section 220" means the coaxial power receiving section 220 scheduled to receive a power supply from the power supply adaptor 100. When the CPU 1 determines that the coaxial power receiving section is a valid coaxial power receiving section 220, processing proceeds to step S245. When determined that the coaxial power receiving section is not the valid coaxial power receiving section 220, processing proceeds to step S32. Since a medium connected at this time to the power supply adaptor 100 by way of the coaxial cable 30 is not an electrical device scheduled to receive a power supply, supplying electric power to the electric device is stopped for an indefinite period, and power supplying is not retried (step S32).

In step S25, when the CPU 1 determines that an anomaly is not in authentication processing performed in step S23, processing proceeds to step S28. When an anomaly is determined exist in authentication processing, processing proceeds to step S26.

Since in step S26 an anomaly is determined to exist in authentication processing pertaining to step S25, the CPU 1 brings the output control circuit into a state of no power supplying. Supplying a low voltage to the power receiving adaptor 200 is stopped.

In step S27, when determined that a power supply stop time exceeded a specified time, the CPU 1 brings the output control circuit 12 into a state of power supplying. The coaxial power supplying section 120 thereby restarts supplying a low voltage, thereby starting the power receiving adaptor 200 (step S22). The CPU 1 retries processing for authenticating the CPU 2 of the power receiving adaptor 200 (step S23). The specified time referred to herein is set to; for instance, one second.

In step S28, a live part is not detected, and the destination of a power supply is the valid coaxial power receiving section 220. Further, an anomaly does not exist in authentication processing. For these reasons, the CPU 1 commands the AC-DC converter section 135 to switch between a low voltage and a high voltage. The AC-DC converter section 135 thereby generates a high voltage, and hence a high voltage is fed to the power receiving adaptor 200.

Since a live part is detected in step S21, in step S29 the CPU 1 does not bring the output control circuit 12 into a state of power supplying. The live part detection circuit 11 continually detects a live part.

In step S30, the CPU 1 counts a time that elapses since the live part was detected in step S21. When detection of the live part is not resolved within a specified time since the live part was detected, processing proceeds to step S32 (the CPU 1 commands a stop of power supplying for an indefinite period). When the live part is resolved within the specified time since the live part was detected, processing proceeds to step S31. The specified time referred to herein is set to; for instance, one minute.

In step S31, the CPU 1 counts the number of times a live part is detected. When the number of times a live part is detected exceeds a specified count, processing proceeds to step S32 (the CPU 1 commands a stop of power supplying for an indefinite period). When the number of times a live part is detected is equal to or less than the specified count, processing returns to a start. However, when a live part is again detected (step S21), processing again proceeds to step S29. When detection of a live part and resolution of the live part are iterated a number of times and when the CPU 1 determines that the number of times a live part is detected exceeds the specified count, processing proceeds to step S32, where the CPU 1 commands a stop of power supplying for an indefinite period. The specified count referred to herein is taken as; for instance, the count of 30.

In step S32, the CPU 1 commands the coaxial power supplying section 120 to supply electric power for an indefinite period. A retry for supplying electric power to the electric device to be fed is thereby stopped. A stop of power supplying for an indefinite period of time can be canceled by restarting the power supply adaptor 100. When a power supply is stopped for an indefinite period of time, the CPU 1 illuminates or blinks the LED 143. The user can thereby ascertain occurrence of an anomaly in the power supply adaptor 100.

In the present embodiment, safety measures can be taken as the situation demands by selecting either a temporary stop of power supplying or a stop of power supplying for an indefinite period.

Third Embodiment

Figure 9:
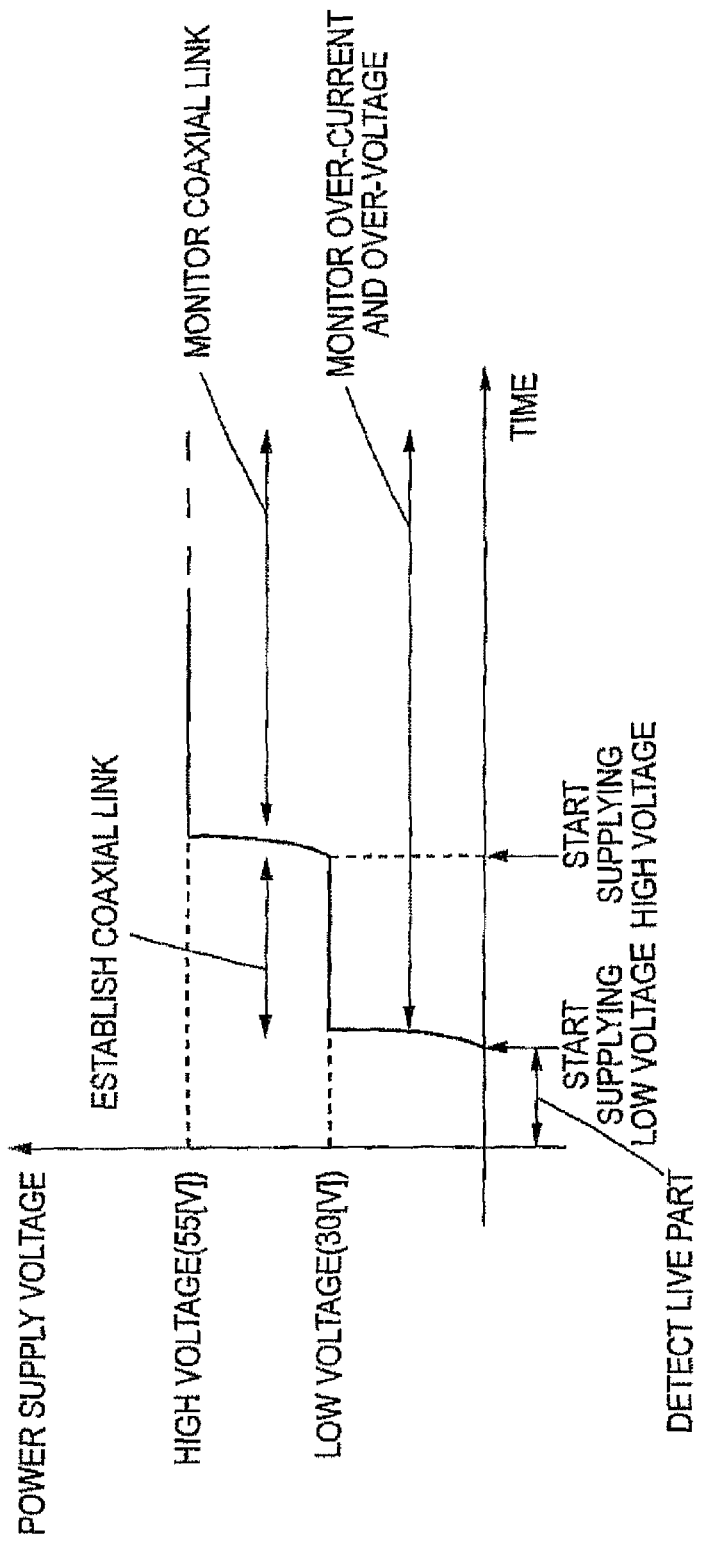
FIG. 9 is a graph for describing an overview of a power supplying method of a third embodiment.
Figure 10:
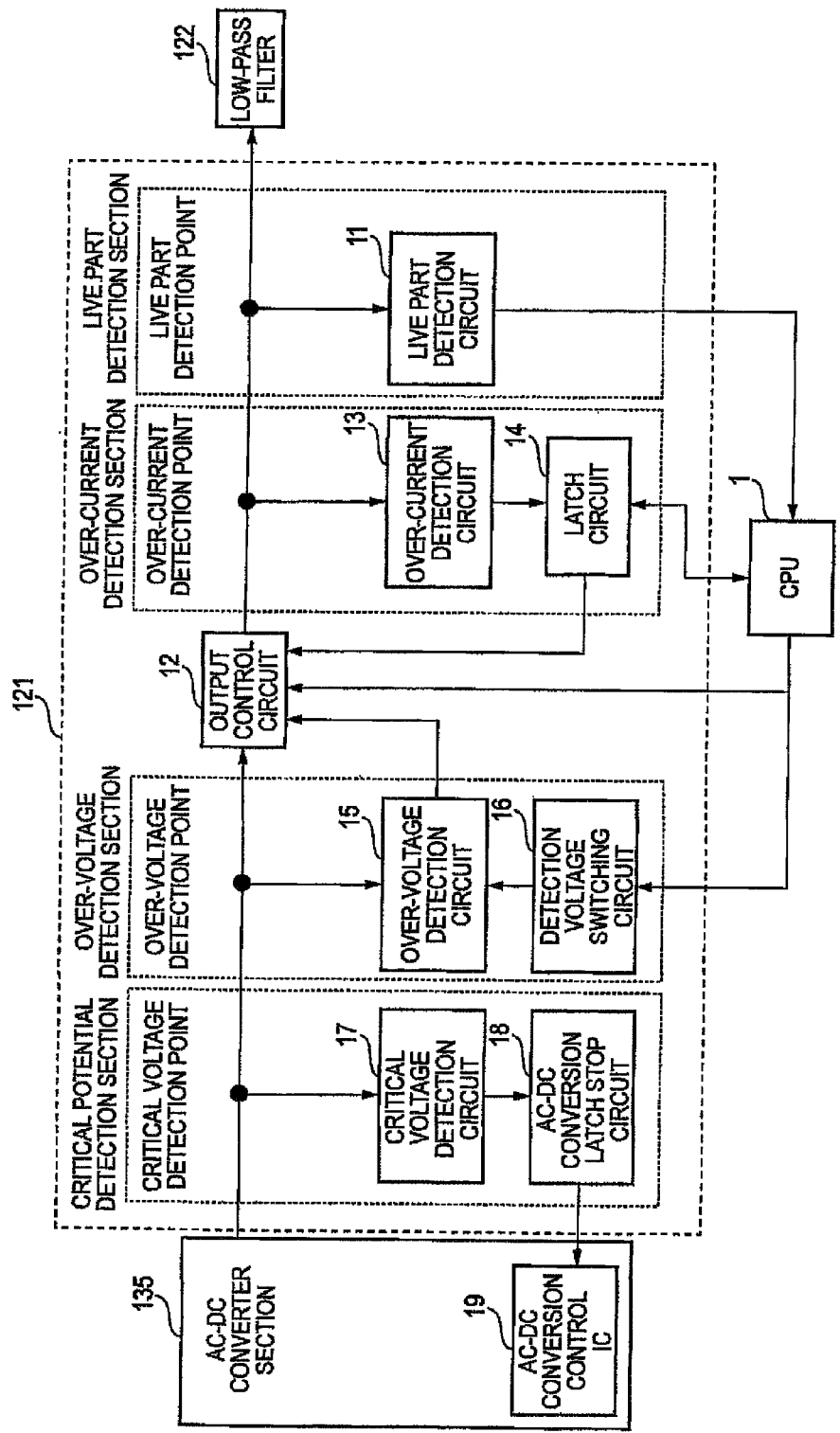
FIG. 10 is a section diagram showing a configuration of an electrical anomaly detection circuit of the third embodiment.
Figure 11:
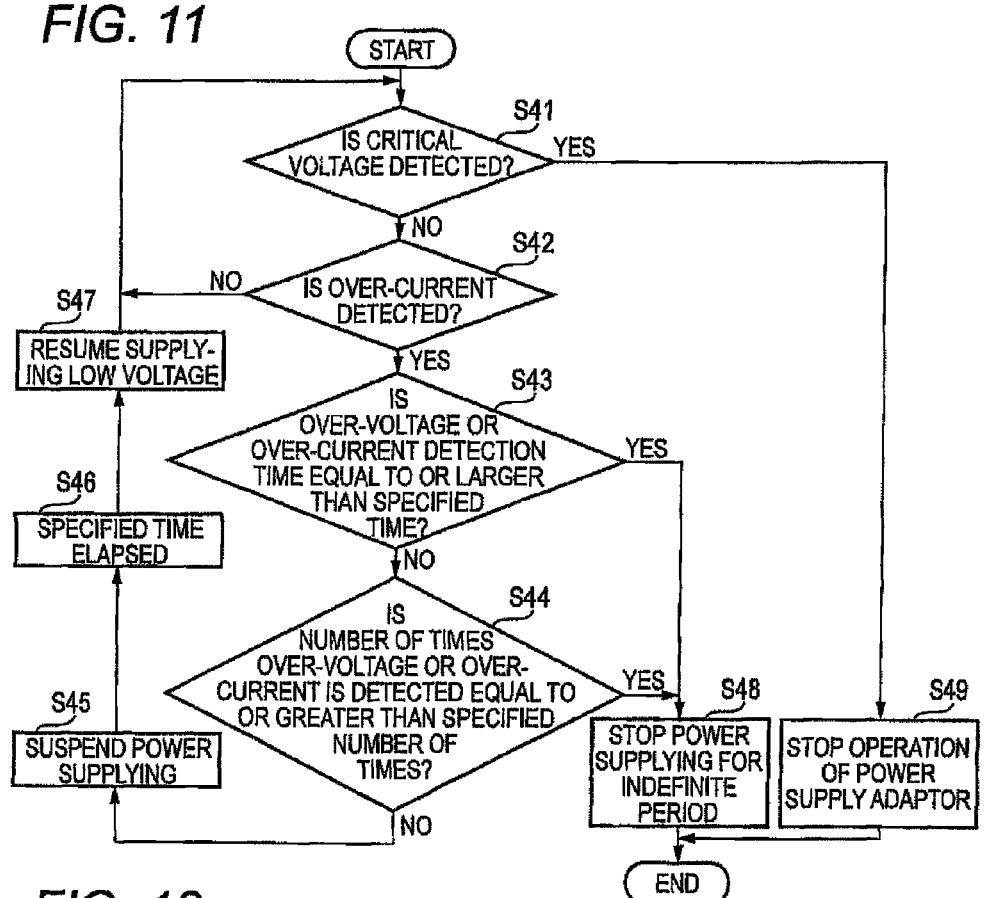
FIG. 11 is a flowchart for a case where an electrical anomaly is detected in the third embodiment.
Figure 12:
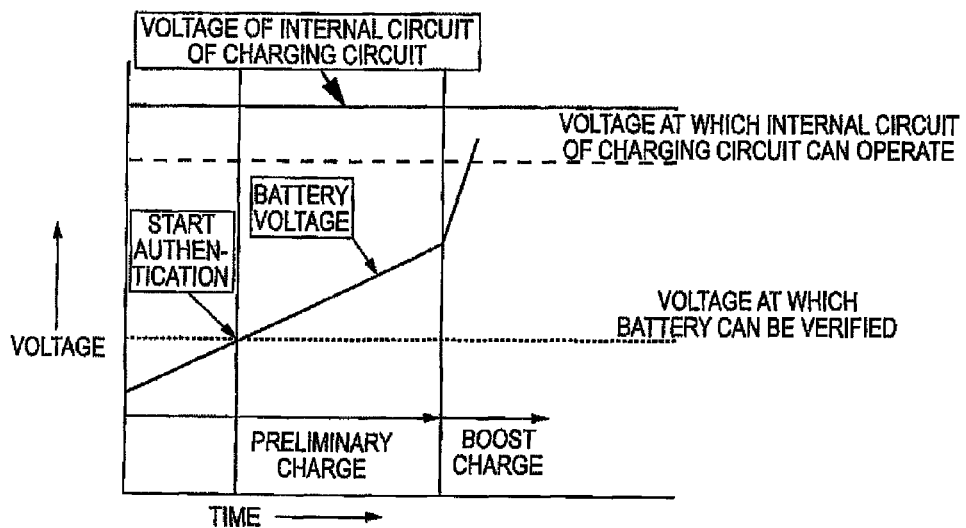
FIG. 12 is a graph showing a related art method for charging a rechargeable battery.

Referring to FIGS. 9 through 11, a third embodiment is hereunder described. FIG. 9 is a graph for describing an overview of a power supplying method of the third embodiment. FIG. 10 is a section diagram showing a configuration of the electrical anomaly detection circuit 121 of the third embodiment. FIG. 11 is a flowchart for a case where an electrical anomaly is detected in the third embodiment. Members having the same configurations and capabilities as those of their counterparts described in the first and second embodiments are assigned the same reference numerals, and their detailed explanations are omitted here for brevity.

A difference between the present embodiment and the first embodiment lies in a detailed configuration of the electrical anomaly detection circuit 121 and in that occurrence of an over-voltage and an over-current is monitored after supplying of a low voltage is commenced. As shown in FIG. 9, in the present embodiment, after the power supply adaptor 100 started supplying a low voltage to the power receiving adaptor 200, the electrical anomaly detection circuit 121 monitors an occurrence of an over-voltage and an over-current as well as performing detection of a live part described in connection with the first embodiment. When detected occurrence of an over-current or an over-voltage, the power supply adaptor 100 stops power supplying or its own operation. The power supply adaptor 100 can thereby safely operate.

After started supplying a low voltage to the power receiving adaptor 200, the power supply adaptor 100 automatically monitors occurrence of an over-current and an over-voltage. For this reason, strictly speaking, the CPU 1 starts monitoring occurrence of an over-current and an over-voltage faster than starting establishing a coaxial link to the power receiving adaptor 200.

The detailed configuration of the electrical anomaly detection circuit 121 of the present embodiment is now described by reference to FIG. 10.

An over-current detection circuit 13 detects an electric current at an over-current detection point. When the over-current detection circuit 13 detects an electric current which is larger than a threshold value (i.e., an over-current), a latch circuit 14 switches the output control circuit 12 to the state of no power supplying and also notifies the CPU 1 of detection of an over-current. By virtue of provision of the latch circuit 14, even when an over-current has momentarily occurred, the output control circuit 12 can be switched to a state of no power supplying. The threshold value used for determining occurrence of an over-current is set to; for instance, 750 to 800 mA.

An over-voltage detection circuit 15 detects an electric potential at an over-voltage detection point. When detected an electric potential (an over-voltage) that is a threshold value or more, the over-voltage detection circuit 15 switches the output control circuit 12 to the state of no power supplying. A detection voltage switching circuit 16 notifies the over-voltage detection circuit 15 of occurrence of switching between a supply of a low voltage and a supply of a high voltage, which is notified by the CPU 1. The over-voltage detection circuit 15 thereby changes the threshold value used for determining an over-voltage. For instance, a voltage of 40V or more is taken as an over-voltage in the middle of supplying of a low voltage, whereas 59V or more is taken as an over-voltage in the middle of supplying of a high voltage.

A critical voltage detection circuit 17 detects an electric potential of a critical voltage detection point. When the critical voltage detection circuit 17 detects an electric potential (a critical voltage) that is a threshold value or more, an AC-DC conversion latch stop circuit 18 immediately notifies an AC-DC conversion control IC 19, which is included in the AC-DC converter section 135, of detection of a critical voltage. The AC-DC conversion control IC 19 thereby stops operation for converting an AC voltage into a predetermined DC voltage. Specifically, supplying electric power to the power receiving adaptor 200 is stopped, and the power supply adaptor 100 becomes inoperable. The critical voltage referred to herein is set to; for instance, 68V or more.

Referring to FIG. 11, operation of the electrical anomaly detection circuit 121 performed after commencement of power supplying is now described. After commencement of supplying of a low voltage, the electrical anomaly detection circuit 121 detects occurrence of a critical voltage, an over-voltage, and an over-current at all times.

In step S41, the critical voltage detection circuit 17 detects a critical voltage. When a critical voltage is not detected at a critical voltage detection point, processing proceeds to step S42. In contrast, when the critical voltage is detected, processing proceeds to step S49.

In step S42, the over-voltage detection circuit 15 detects an over-voltage, and the over-current detection circuit 13 detects an over-current. When an over-voltage is not detected at the over-voltage detection point and when an over-current is not detected at the over-current detection point, processing returns to the start. When either the over-voltage or the over-current is detected, processing proceeds to step S43. When an over-current is detected, the latch circuit 14 notifies the CPU 1 of detection of the over-current. When an over-voltage is detected, the over-voltage detection circuit 15 notifies the CPU 1 of detection of the over-voltage.

Since the critical voltage, the over-voltage, and the over-current are monitored at all times, processing pertaining to steps S41 and S42 is iterated when an electrical anomaly is not detected. Detection of the critical voltage, the over-voltage, and the over-current is not restricted to any specific sequence, and detection is performed at all times in parallel after commencement of power supplying.

In step S43, the CPU 1 counts at least either an over-current detection time or an over-voltage detection time. When the over-current detection time or the over-voltage detection time is not detected in excess of a specified time, processing proceeds to step S44. In contrast, when the over-current detection time or the over-voltage detection time is detected in excess of the specified time, processing proceeds to step S48. The specified time is herein taken as; for instance, one minute. The specified time for the over-current detection time and the specified time for the over-voltage detection time may also be set individually.

In step S44, the CPU 1 counts at least either the number of times an over-current is detected or the number of times an over-voltage is detected. When the number of times an over-current is detected or the number of times an over-voltage is detected is not the specified number of times or more, processing proceeds to step S45. In contrast, when the number of times an over-current is detected or the number of times an over-voltage is detected is the specified number of times or more, processing proceeds to step S48. The specified number of times referred to herein is taken as; for instance, 30 times. Moreover, the specified number of times for the number of times an over-current is detected and the specified number of times for the number of times an over-voltage is detected can also be set separately.

In step S45, supplying electric power to the power receiving adaptor 200 is stopped. When an over-current is detected, the latch circuit 14 switches the output control circuit 12 to a state of no power supplying. When an over-voltage is detected, the over-voltage detection circuit 15 switches the output control circuit 12 to the state of no power supplying.

In step S46, the CPU 1 counts a time from timing at which a power supply is temporarily stopped in step S45 to a specified time. The specified time referred to herein is set to; for instance, one second.

In step S47, a supply of a low voltage is resumed. The CPU 1 switches the output control circuit 12 to the state of power supplying. The power supply adaptor 100 thereby resumes supplying electric power to the power receiving adaptor 200. The electrical anomaly detection circuit 121 again monitors occurrence of a critical voltage, an over-voltage, and an over-current.

In step S48, supplying electric power to the power receiving adaptor 200 is stopped for an indefinite period. When the over-voltage detection time is in excess of the specified time or when the number of times an over-voltage is detected is the specified number of times or more, the over-voltage detection circuit 15 brings the output control circuit 12 into the state of no power supply. When the over-current detection time is the specified time or more or when the number of an over-current is detected is the specified number of times or more, the latch circuit 14 brings the output control circuit 12 into a state of no power supplying. Further, the CPU 1 determines a stop of a power supply for an indefinite period, and the power supply adaptor 100 is re-started, whereby the stop of a power supply for an indefinite period can be canceled. Moreover, when the power supply is stopped for an indefinite period, the CPU 1 illuminates or blinks the LED 143. The user can thereby find an anomaly in the power supply adaptor 100.

In step S49, operation of the power supply adaptor 100 is stopped. When the critical voltage detection circuit 17 detects a critical voltage, the AC-DC conversion latch stop circuit 18 notifies the AC-DC conversion control IC 19 of detection of the critical voltage. The AC-DC conversion control IC 19 thereby stops voltage conversion operation of the AC-DC converter section 135. Supplying electric power to the power supply adaptor 100 is thereby stopped, and hence the power supply adaptor 100 becomes inoperable.

In the present embodiment, safety measures can be taken as the circumstance demands by selecting any one from a temporary stop of a power supply, a stop of a power supply for an indefinite period, and stopping operation of the power supply adaptor 100.

A one-to-one communication and a power supply effected between the power supply adaptor 100 and the power receiving adaptor 200, such as those shown in FIG. 1, have been described in the first through third embodiments. However, the coaxial cables 30 can also be shared among one power supply adaptor 100 and the plurality of power receiving adaptors 200. Further, even when the plurality of power receiving adaptors 200 can also be connected to the coaxial cable 30, the power receiving adaptors 200 are compatible with a supply of a high voltage, and the power supply adaptor 100 can supply electric power to the plurality of power receiving adaptors 200. In this case, a communication is established between the power supply adaptor 100 and the plurality of power receiving adaptors 200 by use of a single band at all times. For this reason, it is necessary for the power supply adaptor 100 or the power receiving adaptors 200 to transmit a multi-carrier signal after a vacancy in the transmission channel has been checked. The first through third embodiments can be combined as required.

As mentioned above, the power supply adaptors described in connection with the embodiments can interlink electric devices through use of an IP and an existing coaxial cable.

This application claims the benefit of Japanese Patent application No. 2010-137963 filed on Jun. 17, 2010, the entire contents of which are incorporated herein by reference.

DESCRIPTIONS OF THE REFERENCE NUMERALS AND SYMBOLS

1, 2 CPU
10 Television Set
11 Live Part Detection Circuit
12 Output Control Circuit
13 Over-Current Detection Circuit
14 Latch Circuit
15 Over-Voltage Detection Circuit
16 Detection Voltage Switching Circuit
17 Critical Voltage Detection Circuit
18 AC-DC Conversion Latch Stop Circuit
19 AC-DC Converter Control IC
20 Network Camera
30 Coaxial Cable
31 Coaxial Adaptor
40 BS Antenna
100 Power Supply Adaptor
110, 210 Multi-Carrier Communication Section
111, 211 Main IC
112, 212 AFE-IC
113, 213 Tx Filter
114, 214 Tx Driver
115, 215 Rx Filter
116, 216 Memory
117, 217 Oscillator
120 Coaxial Supplying Section
121 Electrical Anomaly Detection Circuit
122, 222 Low-Pass Filter
123, 221 Coaxial Connector
130 Power Source Section
131 Power Plug
132 AC Inlet
133 Protective Circuit
134 Noise Suppression Circuit
135 AC-DC Converter Section
136, 137, 223 DC-DC Converter Section
141 Modular Jack (with Built-In Transformer)
142, 243 Ethernet (Registered Trademark) PHY-IC
143, 243 LED
144, 244 Switch
145, 245 Coupler Transformer
200 Power Receiving Adaptor
220 Coaxial Power Receiving Section
224 Voltage Detection Circuit
230 (PoE) Power Supply Section
241 Modular Jack
242 Pulse Transformer

What is claimed is:

1. A communication device that communicates with another communication device and supplies electric power to the another communication device by way of a transmission channel, the device comprising:
    a first detection section capable of detecting a connection of an electric-device other than the another communication device to the transmission channel; and
    an output control section capable of controlling a supply of electric power to the another communication device, wherein
    the output control section supplies no power to the another communication device if the first detection section detects the connection of the electric device.

2. The communication device according to claim 1, further comprising:
    a control section capable of controlling the communication device, wherein the output control section supplies a first voltage to the another communication device if the first detection section does not detect the connection of the electric device; and wherein the output control section supplies a second voltage to the another communication device if the control section authenticates the another communication device.

3. The communication device according to claim 1, further comprising:
    a second detection section, wherein the output control section stops a power supply to the another communication device if the second detection section detects an over-current during a power supply.

4. The communication device according to claim 1, further comprising:
    a third detection section, wherein the output control section stops a power supply to the another communication device if the third detection section detects an over-voltage during a power supply.

5. The communication device according to claim 1, further comprising:
    a voltage generation section that generates a supply voltage; and a fourth detection section: wherein the voltage generation section stops generating of a supply voltage if the fourth detection section detects a critical voltage during a power supply.

6. A power supplying method for use with a communication device that communications with another communication device and supplies electric power to the another communication device by way of a transmission channel, the method comprising:
- detecting a connection of an electric device other than the another communication device to the transmission channel; and
- supplying no power to the another communication device if there is a connection of the electric device to the transmission channel.

7. The power supplying method according to claim 6, further comprising:
- supplying a first voltage to the another communication device if the electric device is not connected to the transmission channel;
- authenticating the other another communication device; and
- supplying a second voltage to the another communication device after completion of authentication of the another communication device.

8. The power supplying method according to claim 7, wherein supplying the first voltage to the another communication device is stopped if authentication of the another communication device is not completed.

9. The power supplying method according to claim 7, further comprising:
- monitoring occurrence of a critical voltage in the communication device after commencing to supply the first voltage to the another communication device; and
- stopping operation of the communication device if the critical voltage is detected.

10. The power supplying method according to claim 7, further comprising:
- monitoring occurrence of an over-voltage in the communication device after commencing to supply the first voltage to the another communication device; and
- stopping the power supply to the another communication device if the over-voltage is detected.

11. The power supplying method according to claim 7, further comprising:
- monitoring occurrence of an over-current in the transmission channel after commencing to supply the first voltage to the another communication device; and
- stopping the power supply to the another communication device if the over-current is detected.

12. A power supply system including:
- a first communication device capable of:
- establishing a communication with a second communication device and supplying electric power to the second communication device by way of a first transmission channel, wherein
- the first communication device stops a power supply to the second communication device if the first communication device detects connection of an electric device other than the second communication device to the first transmission channel.

13. The power supply system according to claim 12,
- wherein the second communication device is capable of communicating with a second electric device by way of a second transmission channel; and wherein
- the second communication device supplies electric power to the second electric device by way of the second transmission channel.

14. A communication device that supplies power to another communication device via a transmission channel, the communication device comprising:
- an output control section capable of controlling supply of power to the another communication device which is connected to the transmission channel and capable of supplying no power to the another communication device if an electric device is connected to the transmission channel.

* * * * *